United States Patent [19]

Walt, Jr.

[11] Patent Number: 4,909,335

[45] Date of Patent: Mar. 20, 1990

[54] DEEP TILLAGE SHANK SYSTEM

[76] Inventor: Ted Walt, Jr., P.O. Box 33, Collyer, Kans. 67631

[21] Appl. No.: 352,285

[22] Filed: May 16, 1989

[51] Int. Cl.$^4$ ............................................. A01B 49/02
[52] U.S. Cl. .................................... 172/166; 172/196; 172/192; 172/253; 172/504
[58] Field of Search ............... 172/166, 382, 145, 253, 172/254, 250, 504, 196, 744, 668, 140, 195; 111/140, 145, 146, 147

[56] References Cited

U.S. PATENT DOCUMENTS

| | | |
|---|---|---|
| 897,365 | 9/1908 | Heinze . |
| 1,949,059 | 2/1934 | LeTourneau ..................... 172/504 |
| 2,163,805 | 6/1939 | Pendell ........................ 172/699 X |
| 3,058,243 | 10/1962 | McGee . |
| 3,714,992 | 2/1973 | Meier ............................ 172/196 |
| 3,807,507 | 4/1974 | Hecker ........................... 172/196 |
| 4,280,563 | 7/1981 | Crow ............................. 172/253 |
| 4,429,750 | 2/1984 | Pope ............................. 172/253 |
| 4,537,262 | 8/1985 | van der Lely .................. 172/146 |
| 4,580,506 | 4/1986 | Fleischer et al. ............... 172/744 |

FOREIGN PATENT DOCUMENTS

| | | | |
|---|---|---|---|
| 1194498 | 5/1959 | France ........................... | 172/744 |
| 2033192 | 5/1980 | United Kingdom ............. | 172/382 |

*Primary Examiner*—Richard J. Johnson
*Attorney, Agent, or Firm*—Litman, McMahon & Brown

[57] ABSTRACT

An agricultural earth working system including a vertically adjustable deep tillage tool in tandem with a V-shaped sweep blade tool, the system being mounted on a field traversable frame and adapted to be drawn through the field by a conventional farming tractor. A disk is positioned in front of a shank for the sweep blade tool. The system cuts roots of weeds with the sweep blade and at the same time deep shatters or cultivates the soil with the deep tillage tool in such a manner that very little of the field surface is disturbed, so as to retain stubble cover and prevent erosion, yet destroying the weeds and sufficiently working the ground beneath the surface, especially with the deep tillage tool to enhance water absorption.

2 Claims, 2 Drawing Sheets

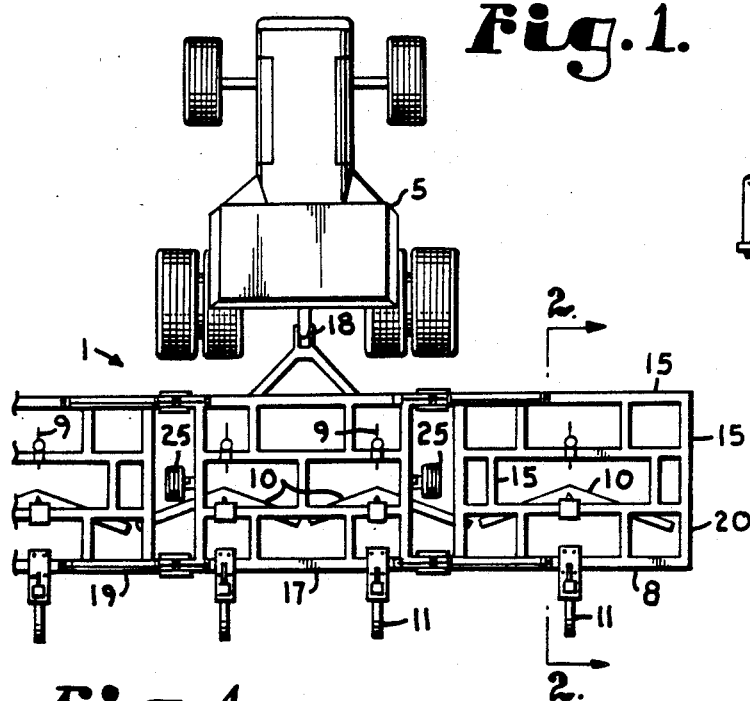
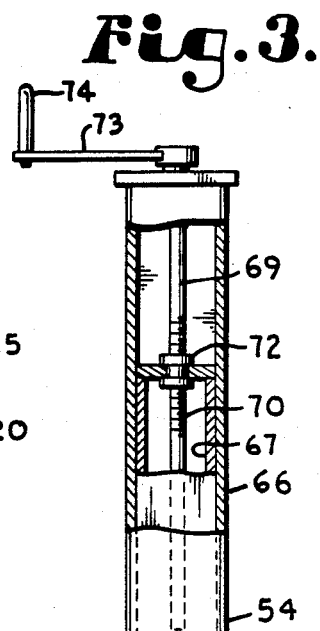
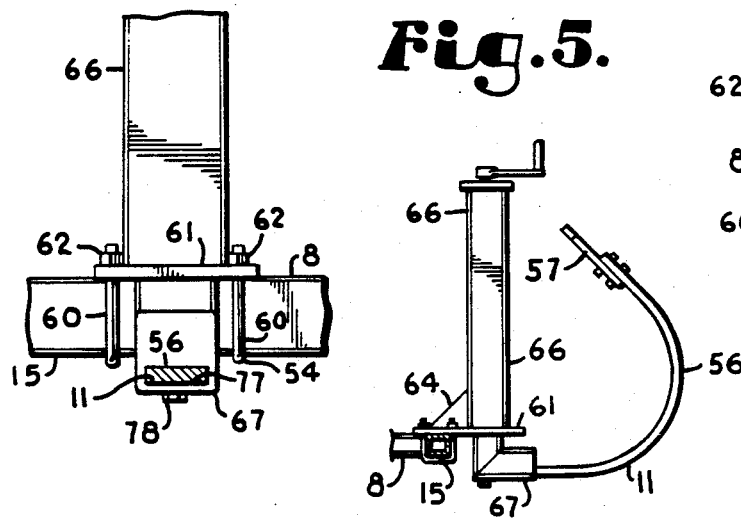
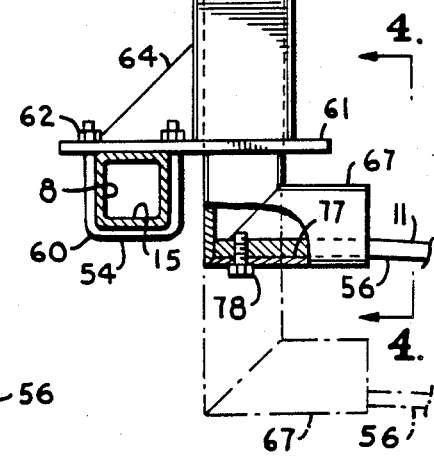

DEEP TILLAGE SHANK SYSTEM

FIELD OF THE INVENTION

The present invention relates to farming machinery and, more particularly, to a combined sweep blade tool and adjustable deep tillage tool in tandem with the sweep blade tool, the combination being adapted to be drawn through the earth by a farming tractor.

BACKGROUND OF THE INVENTION

Modern farmers have learned from the lessons of agricultural history that leaving fields with no protective cover can and does lead to severe soil errosion, if certain climactic conditions occur. Consequently, many farmers of today have adapted "no till" or at least low tillage farming techniques, where surface coverage is disturbed as little as possible.

Subterranean sweep blades (generally relatively flat blades have a V-shaped configuration wherein the point of the V is pointed in the direction of travel of the blade) are sometimes utilized for this purpose, since such sweep blades traverse the soil below surface level and, therefore, do not substantially disturb the crop residue or stubble left on the surface except for the relatively narrow path of the shank of the blade.

Although sweep blades are useful in helping to destroy weeds, such blades effectively agitate or work only a relatively thin layer of soil beneath the surface. Such agitating or working is important to farming operations as the unpacked or loosened soil tends to absorb more water, so as to reduce rain runoff and soil erosion, while providing planted crops with additional moisture.

However, many types of soil are such that the working due to the sweep blades is not sufficiently deep to allow for proper water absorption. This is especially true in the "hard pan" type soils in portions of Wichita, Kansas and other midwestern states, where the soil is very hard packed and prevents substantial moisture absorption, especially during hard rains.

Conventionally, farmers have deep tilled the hard pan fields using cultivating techniques that also included working of substantially all of the surface soil of a field, thereby destroying field cover and leaving the field susceptible to wind erosion. Deep tillage tools typically have a blade or tooth that is relatively narrow and is drawn through the soil relatively deep as compared to most other cultivating methods. The tooth tends to "shatter" the hard soil thereby unpacking the soil and allowing better water absorption.

Consequently, it is deemed desirable to be able to obtain the benefits of weed destruction, while also unpacking, agitating or loosening the earth beneath the surface enough to absorb a substantial amount of moisture without destroying most of the field cover.

It is also noted that conventional farm machinery for the tilling of the soil typically mounts sweep blades and cultivating tools on separate field traversing frames. Thus, if a farmer wanted to both sweep cut roots and cultivate a field, such procedures would require at least two trips around the field: one using the sweep blades and the second using the cultivating tools. It would also be difficult for the farmer to precisely follow his previous paths such that the shanks of both the sweep blades and the cultivator tools followed the same path, hence a substantial portion of the surface of the field would be likely to be disturbed.

No present farm implement combines the sweep blade tools and the deep tillage tools as a combined system so as to cut weeds with the sweep blade and at the same time deeply penetrate and agitate the subsoil without disturbing relatively wide portions of surface, all at the same time. The present invention combines the two operations so that both can be accomplished in a single pass of the farming tractor, thereby saving fuel and time without significant soil disruption.

SUMMARY OF THE INVENTION

The present invention is directed to an improvement in farming equipment effectively combining on a single implement frame a sweep blade tool and vertically adjustable deep tillage tool to simultaneously cut weeds and deeply work the soil with a minimal disruption, churning or turning over of the soil surface (although the soil of the surface may be raised and/or loosened by the action of the implement, the cover remains generally intact except where shanks for the sweep blade tool and the deep tillage tool penetrate the surface), thereby maintaining surface cover over most of the field. Preferably, the equipment includes a plurality of units combining both a deep tillage tool and sweep blade tool in tandem.

Each such unit includes a pair of earth penetrating shanks (when in an operably earth working configuration thereof), attached at upper ends thereof to the frame and at respective lower ends thereof to a sweep blade and to a deep tillage tooth respectively. The shanks of a particular unit are spaced but directly in following alignment, preferably such that the shank of the tillage tool follows directly in the path of the shank of the sweep blade. The frame is generally adapted to traverse a field and is adapted to be drawn by a conventional farming tractor.

Preferably, a plurality of the sweep blade tools are carried in a lateral array on a frame, and a like number of vertically adjustable deep tillage tools is carried on the same frame such that the shank of each deep tillage tool is in tandem to or directly follows the ground surface piercing shank of each sweep blade tool so that both the tillage tool shank and the sweep blade tool shank follow in a relatively narrow common path, producing a relatively narrow furrow and disrupting only a relatively small portion of the surface cover of a remainder of the field.

The deep tillage tool is adjustable by selectively adjusting mechanical or motor height adjustment means such as a jack screw assembly to adjust the depth to which the tool will penetrate the soil. In particular, the depth of penetration of each deep tillage tool is set by adjusting the relative distance of the earth working head or tooth of the deep tillage tool below the frame.

In another embodiment, vertical adjustment of the deep tillage tool is effected by a linear hydraulic motor or similar motorized means, the cylinder or piston of which is kinematically part of the deep tillage tool shank and the piston or cylinder, as the case may be, is kinematically part of the frame. The motor control is mountable on the frame or the tractor or there are parallel controls on both.

OBJECTS OF THE INVENTION

The principal objects of the present invention are: to provide an improved farm machinery system for simultaneous weed cutting and deep tillage ground working with minimal surface disturbance to preserve ground cover while improving the water absorption capacity of the soil; to provide such a system with the contemporaneous ability to cut weeds subterraneously and to make a deep penetration of the soil to break up hard pan soil, while disrupting surface soil only along a relatively narrow furrow; to provide such a system wherein weeds are cut by a sweep blade and additional soil working is effected by a deep tillage tool operating in the same furrow produced by a shank of the sweep blade; to provide a system wherein multiple combined units each comprising a sweep blade tool and deep tillage tool mounted in a lateral array on a frame adapted to be drawn by a conventional farming tractor thereby enabling earth working operations to occur in parallel furrows over a relativley wide swatch at the same time; to provide such a system wherein the deep tillage tool is vertically adjustable either manually or by use of an operator controllable motor; to provide such a system constructed, as much as possible, from readily available components; to provide such a system which may be readily retrofitted to a great number of existing farming equipment frames; and to provide such a system which is economical to manufacture, reliable in operation, and which is particularly well suited for the intended purpose thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary and top plan view showing a conventional tractor drawing an agricultural earth working apparatus including an equipment frame having mounted thereon a plurality of soil working units, each unit comprising an earth working sweep blade tool and a deep tillage tool, according to the present invention.

FIG. 2 is an enlarged and fragmentary side elevational view of the apparatus shown in an earth working configuration, taken along line 2—2 of FIG. 1.

FIG. 3 is an enlarged and fragmentary cross-sectional view similar to FIG. 2 showing a vertical adjustment mechanism for the deep tillage tool, with portions broken away to show detail thereof.

FIG. 4 is an enlarged and fragmentary cross-sectional view of the apparatus, taken along line 4—4 of FIG. 3, showing the deep tillage tool.

FIG. 5 is an enlarged and cross-sectional view of the apparatus, similar to FIG. 2, except with the deep tillage tool in a non-earth working configuration.

DETAILED DESCRIPTION OF THE INVENTION

Figure 6:
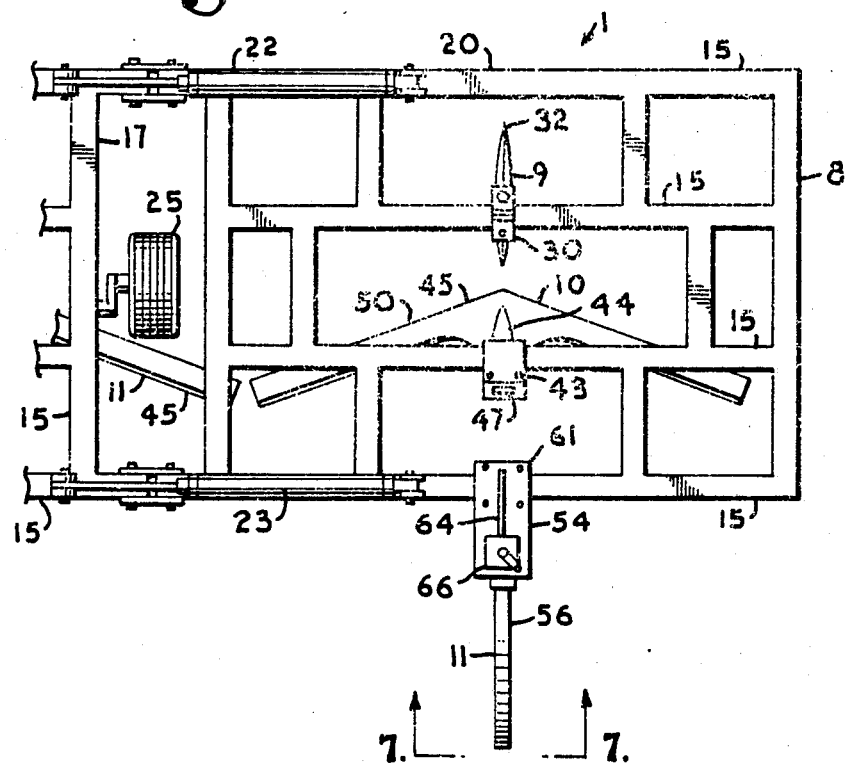
FIG. 6 is an enlarged and fragmentary view of the apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an agricultural apparatus 1 in accordance with the invention of the present application.

The apparatus 1 is illustrated in FIG. 1 being drawn by a self-propelled and operator controlled tractor 5. The apparatus 1 includes an implement frame 8 having mounted thereon a plurality of disc tools 9, a like number of V-shaped sweep blade tools 10 and also a like number of deep tillage tools 11.

The frame 8 includes a matrix of structural elements 15 laid in spaced or perpendicular relationship with respect to one another to form a horizontally spaced grid. The frame 8 includes a central section 17 connected to the tractor 5 by a hitch 18 and a pair of side frames 19 and 20 on opposite sides of and pivotally connected to the center section 17.

The side frames 19 and 20 can be pivoted about an axis connecting each to the center section 17 between a raised position for transport and a lowered position (as seen in FIG. 1) for working a field by selective operation of hydraulic rams 22 and 23 respectively. The frame 8 can also be selectively moved between a raised or transport position for transport and a field or earth working position wherein the disc tools 9, the sweep blade tools 10 and the deep tillage tools engage and work the ground, as seen in FIG. 2, by operation of hydraulically pivoted wheels 25.

Each of the disc tools 9 include a mounting bracket 30, a shank 31 and a disc 32. The mounting bracket 30 may be any conventional structure utilized for connecting agricultural tools to a support frame. In particular, each of the mounting brackets 30 wraps about and is secured to one of the frame structural elements 15. Held by each of the mounting brackets 30 is a respective shank 31 and the mounting bracket 30 preferably includes a means for allowing the shank 31 to be selectively height adjusted relative to the mounting bracket 30 and then fixed in position, such as by set screw or the like.

Each of the shanks 31 diverge into a lower clevis 33 having an axle 34 at a lower end thereof to pivotally mount a respective disc 32. Each disc 32 is centrally mounted on a respective axle 34 so as to be rotatable thereabout. The position of the shank 31 is adjusted relative to the mounting bracket 30 such that the disc 32 of each of the disc tools 9 is positioned so that when the apparatus 1 is drawn across a field 38 with stubble and other vegetation 39 located upon the surface 40 thereof, the discs 32 are urged sufficiently into the surface 40 to cut the stubble and other vegetation 39 such that the stubble and other vegetation 39 will not wrap about and collect upon subsequent tools.

Each of the sweep blade tools 10 include a mounting bracket 43, a tool shank 44 and a sweep blade 45. Each of the mounting brackets 43 include a C-clamp 46 that wraps about and is secured to one of the frame structural members 15. Each of the mounting brackets 43 is also secured to an upper end 47 of a respective tool shank 44. Each of the tool shanks 44 depend from a respective mounting bracket 43 and curve slightly forward, as seen in FIG. 2. A lower end 48 of each of the tool shanks 44 is secured by bolts, welding or the like to a respective sweep blade 45.

Each of the sweep blades 45 include a generally V-shaped blade member 50. Each of the blade numbers 50 are positioned relative to the frame 8 to be drawn subterraneously and substantially beneath the field surface 40 when the frame wheels 25 are retracted and the apparatus 1 is being drawn through the field 38. A suitable depth for the V-shaped blade member 50 has been found to be approximately four inches beneath the field surface 40. Once drawn into the ground by the tractor 5, each of the V-shaped blade members 50 are located beneath the field surface 40 with only the tool shanks 44 associated therewith passing through and extending above the field surface 40.

Figure 7:
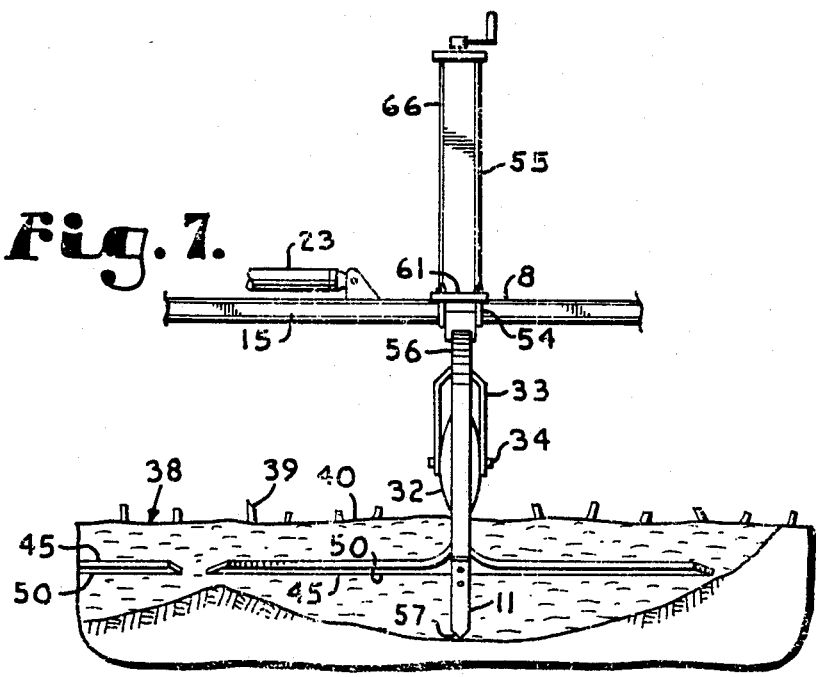
FIG. 7 is an enlarged and fragmentary rear elevational view of the apparatus showing a soil working unit with a sweep blade tool and a deep tillage tool thereof with shanks of both tools in tandem, taken along line 7—7 of FIG. 6.

Adjacent V-shaped blade members 50, such as seen in FIGS. 6 and 7, cut a substantially continuous plane through a field 38 just below the surface 40 thereof without substantially disrupting the surface 40 or the stubble and other vegetation 39 thereon except whereat the tool shanks 44 pass through the surface 40. The V-shaped blade members 50 are positioned to cut side by side so as to leave little or no portion of a swath of a field over which the apparatus 1 traverses without subsurface weed root cutting. It is foreseen that the blade member 50 may be aligned in a staggered to alternating configuration provided that the tips of the blade member 50 pass relatively close to or in overlapping relationship to each other as seen in FIG. 7. Each of the tool shanks 44 is effectively lined up behind or in tandem behind a respective disc 32 such that a tool shank 44 travels in approximately the same furrow created by a respective disc 32.

Each of the deep tillage tools 11 includes mounting structure 54, a height adjustment mechanism 55, a shank 56 and a soil working tooth 57. Each mounting structure 54 includes a pair of C-shaped bolts 60 which operably surround one of the structural elements 15 and which are secured to a plate 61 by nuts 62. In this manner, each of the mounting structures 54 is secured to a respective structural element 15 of the frame 8. The mounting structure 54 also includes a gusset 64 attached to and extending upwardly from the plate 61 and attached to the height adjustment mechanism 55 to stabilize the connection therebetween.

The height adjustment mechanism, which is best seen in FIG. 3, includes a fixed tower 66 having an L-shaped slide member 67 slidably received through an open bottom thereof. The tower 66 is elongate and extends upwardly from the plate 61. The tower includes near an upper end thereof adjustment means, such as the illustrated jack screw 69. The jack screw 69 is supported by the top of the tower 66 and has a central shaft 70. The shaft 70 is threaded and has a thread riding sleeve 72 which moves up and down the shaft 70 when the jack screw 69 is rotated. The sleeve 72 is attached to the top of the slide member 67 such that rotation of the shaft 70 causes the slide 72 and, consequently, the slide member 67 to linearly move or reciprocate within the tower 66. The direction of rotation of the shaft 70 determines whether the slide member 67 moves further into or out of the tower 66 and, consequently, whether the slide member 67 moves upwardly or downwardly. A crank 73 having an operator handle 74 is attached to the shaft 70 to rotate same under control of an operator. It is foreseen that a mechanical device such as a hydraulic or electric motor may also be utilized to rotate the shaft 70.

Movement is shown in FIG. 3 of the slide member 67 from a raised position shown in solid lines to a lowered position shown in dashed lines.

Each deep tillage shank 56 is received in a slot 77 in a respective slide member 67, as seen in FIG. 4. An upper end of the shank 56 is removably secured in the slide member 67 by a locking bolt 78, as seen in FIG. 3. The shank 56 extends rearwardly from the slide member 67 and, when in an operating configuration thereof, arcuately curves downwardly. A lower end of the shank 56 is attached to a soil working tooth 57 by bolts or the like. Each tooth 57 may be any conventional deep tillage soil working or shattering device.

The depth which each soil working tooth 57 penetrates the ground is adjusted by operation of the height adjustment mechanism 55. In some soils and for use during certain parts of the year, the depth of the soil working tooth 57 will be selectively set deeper than at other times of the year, for example, the depth of the bottom of the tooth 57 may be set to generally be eight inches below the field surface 40.

It is also possible during certain times of the year, especially when the ground is very soft, that the deep tillage tools 11 are not required to work the earth. In such an instance, the shanks 56 may be removed from their associated slide members 67 and reversed in the slots 77 so as to extend upwardly, as seen in FIG. 5. This mode of operation may also be utilized in transport, if it is desirable to ensure that the deep tillage tools 11 do not scrape along the surface of roads or the like.

In use, the apparatus 1 is drawn to a field 38 with the side frames 19 and 20 in a raised position and with the wheels 25 in a lowered position to raise the tools 9, 10 and 11 and prevent same from engaging the ground. Once in position in the field 40, the side frames 19 and 20 are lowered and the wheels 25 are raised such that the tools 9, 10 and 11 come into engagement with the ground surface 40. The tractor 5 is then driven a short distance during which time the weight of the apparatus 1 causes the sweep blade V-shaped members 50 to pass through the surface 40 of the field 38 so as to be positioned completely beneath the surface 40, as seen in FIGS. 2 and 7 with the tool shank 44 associated with each sweep blade tool 10 penetrating the field surface 40. Each disc 32 is also in engagement with the ground when the apparatus 1 is in an operable configuration, such as is shown in FIGS. 2 and 7.

If deep tillage is desired, the deep tillage tools 11 are configured as is shown in all of the figures except for FIG. 5 and the height adjustment mechanisms 55 of each such tool 11 are adjusted so as to position the lower end of the soil working tooth 57 at an appropriate depth in the field 38. Preferably, the deep tillage tools 11 shatter or work the earth in such a manner to work cooperatively with the sweep blades 45 positioned directly in front thereof so as to work the earth beneath the field surface 40 as they are being drawn across the field 38. The shanks 56 of the deep tillage tools 11 follow directly behind the shanks 44 of the sweep blade tools 10 such that only a relatively narrow furrow is created in the field 38 that disturbs the stubble 39 and the majority of the stubble 39 is generally undisturbed.

It is to be understood that while certain forms of the present invention have been illustrated and described herein, it is not to be limited to the specific forms or arrangement of parts described and shown.

What is claimed and desired to be secured by Letters Patent is as follows:

1. An agricultural apparatus adapted to be drawn by a tractor through a field and operationally cut roots of weeds in the field while deep tilling the field without disrupting a majority portion of ground cover on the field comprising:
   (a) a field traversable agricultural frame adapted to be connected to the tractor and drawn through the field when said apparatus is in an operational configuration thereof;
   (b) a plurality of laterally spaced discs mounted on said frame and adapted to engage the surface of the field when in the operational configuration so as to cut stubble on the surface of the field in the path of the discs;
   (c) a plurality of V-shaped sweep blade tools, each having a blade and a blade shank; said blades adapted to be positioned entirely beneath the surface of the field when in the operational configuration; said blades being relatively closely spaced in side by side relationship; each of said blade shanks respectively being spaced in tandem behind one of said discs; and
   (d) a plurality of deep tillage tools having a deep tillage tooth and a tillage shank mounted on said frame; each of said tillage shanks respectively being positioned in tandem behind one of said blade shanks such that paired tillage shanks and blade shanks are adapted to follow in generally the same furrow when said apparatus is drawn across a field whereby only stubble on the surface of the field whereat such furrows occur is substantially disrupted by passage of said apparatus.

2. The apparatus according to claim 1 wherein:
   (a) each deep tillage tool includes height adjustment means adapted to allow selective variance of the penetration of said respective deep tillage tool tooth into the field during operational use.

* * * * *